US006950509B2

(12) United States Patent
Schneider

(10) Patent No.: US 6,950,509 B2
(45) Date of Patent: Sep. 27, 2005

(54) METHOD FOR DETERMINING A FREE CONNECTING LINE IN A SWITCHING CENTER HAVING A NUMBER OF SUBSCRIBER ACCESS UNITS

(75) Inventor: Alfred Schneider, Haar (DE)

(73) Assignee: Siemens Aktiengesellschaft, Munich (DE)

( * ) Notice: Subject to any disclaimer, the term of this patent is extended or adjusted under 35 U.S.C. 154(b) by 463 days.

(21) Appl. No.: 10/274,357

(22) Filed: Oct. 21, 2002

(65) Prior Publication Data

US 2003/0112946 A1 Jun. 19, 2003

(30) Foreign Application Priority Data

Oct. 22, 2001 (DE) .......................................... 101 52 009

(51) Int. Cl.[7] .............................................. H04M 7/00
(52) U.S. Cl. .................................. 379/220.01; 379/219
(58) Field of Search ............................ 379/219, 220.01, 379/221.01, 240, 272, 273

(56) References Cited

U.S. PATENT DOCUMENTS

| | | | | | |
|---|---|---|---|---|---|
| 5,920,620 | A | * | 7/1999 | Mori ..................... | 379/220.01 |
| 5,999,614 | A | * | 12/1999 | Doshi et al. ................ | 379/219 |
| 6,188,759 | B1 | * | 2/2001 | Lorenzen et al. ...... | 379/220.01 |
| 6,584,189 | B1 | * | 6/2003 | Hansen et al. ......... | 379/221.02 |
| 6,724,881 | B1 | * | 4/2004 | McAllister et al. .... | 379/220.01 |

FOREIGN PATENT DOCUMENTS

| | | |
|---|---|---|
| DE | 199 46 767 | 4/2001 |
| EP | 0 126 439 | 11/1984 |
| WO | WO 00/16565 | 3/2000 |

OTHER PUBLICATIONS

"EWSD Remote Switching Unit—The Intelligent Solution for a Smart Remote" Siemens AG, 1999.
"Distributed Networking EWSD PowerNode" Siemens AG, 1999.
Brown et al. "No. 10A Remote Switching System, Host Software" The Bell System Technical Journal vol. 61(4), pp. 491–524, 1982.

* cited by examiner

Primary Examiner—Bing Q. Bui
(74) Attorney, Agent, or Firm—Morrison & Foerster LLP

(57) ABSTRACT

A method for determining a free connecting line in a switching center having a number of subscriber access units is provided. The access units are controlled by a switching center. At least one group of transmission lines of a subscriber access unit and, possibly, a group of lines of the line trunk group form a logical group of lines, which connects the switching center to another switching center. When an incoming or outgoing call which is intended for another switching center occurs at the subscriber access unit, a check is carried out to determine whether a connecting line which leads away from this subscriber access unit in the group of lines is free for a call, and, if one of these connecting lines is free, a connection is set up to the other switching center via this connecting line.

14 Claims, 2 Drawing Sheets

METHOD FOR DETERMINING A FREE CONNECTING LINE IN A SWITCHING CENTER HAVING A NUMBER OF SUBSCRIBER ACCESS UNITS

CLAIM FOR PRIORITY

This application claims priority to Application No. 10152009.3 which was filed in the German language on Oct. 22, 2001.

TECHNICAL FIELD OF THE INVENTION

The invention relates to a method for determining a free connecting line in a switching center.

BACKGROUND OF THE INVENTION

Modern switching systems may comprise a number of subscriber access units, which are also referred to as remote switching units (RSU), which are controlled by a central control unit ("coordination processor", CP). The switching units have their own switching network and are also connected via internal lines, that is to say they can also pass on calls between their connections, without having to use lines which pass via the central control unit, although this process is controlled by the central control unit.

The remote switching units of the switching center can be connected via dedicated groups of lines to the surrounding network, that is to say to other switching centers. All the groups of lines from switching units of a switching center which lead to another switching center form a logical group of lines, including the group of lines of the line trunk group of the central control unit, and this connects the switching center to another switching center.

Where an incoming or outgoing call which is intended for a specific other switching center occurs at a switching unit, a switching center such as this may, for example, be a "remote" switching center in another local network or else a switching center in the same local network, the normal procedure is to use a program for line selection to determine all the free lines in the group of lines to the desired switching center and then, for example, to use that line which has not been used for the longest time for that call.

However, this procedure has the disadvantage that, in consequence, calls are passed internally via the switching network and/or internal line via the subscriber access units and/or the central line trunk group, so that this results in an unnecessary internal load on the switching center which, among other things, can lead to delays in setting up connections. Furthermore, this reduces the possibility of there being a free line for a call between two subscriber access units in that switching center.

SUMMARY OF THE INVENTION

According to an aspect of the invention, a method is provided for determining a free connecting line in a switching center. The switching center may have a number of subscriber access units which are controlled by the switching center. The subscriber access units and at least one line trunk group in the switching center are connected to one another via a switching network and/or internal lines. Calls can be passed on between these connections. At least one of the subscriber access units is connected via a group of transmission lines, which comprises a number of transmission lines, to in each case one other switching center. The at least one group of transmission lines of a subscriber access unit and, possibly, a group of lines which has a number of lines of the line trunk group form at least one logical group of lines. The logical group of lines connects the switching center to the other switching center. When an incoming or outgoing call which is intended for another switching center occurs in a switching unit, this call is passed on via one of the lines in the group of lines to the other switching center.

According to a further aspect of the invention, a switching center comprises a number of subscriber access units which are controlled by a switching center. The subscriber access units and at least one line trunk group in the switching center are connected to one another via a switching network and/or internal lines, via which they can pass on calls between their connections. At least one of the subscriber access units is connected via a group of transmission lines, which comprises a number of transmission lines, to in each case one other switching center. The at least one group of transmission lines of a subscriber access unit and, possibly, a group of lines which has a number of lines of the line trunk group form at least one logical group of lines, which connects the switching center to the other switching center. When an incoming or outgoing call which is intended for another switching center occurs in a switching unit, this call is passed on via one of the lines in the group of lines to the other switching center.

According to an aspect of the invention, connections may be set up from a switching center with a number of switching units to another switching center in a manner which is as cost-saving and simple as possible, while at the same time keeping the internal load as low as possible, in particular the load on the control unit and the internal line network in the switching center.

According to a further aspect of this invention, when an incoming or outgoing call occurs at the subscriber access unit, a check carried out to determine whether a connecting line which leads away from this subscriber access unit in the group of lines is free for a call to the desired switching center. If one of these connecting lines is free, a connection is set up to the other switching center via this connecting line.

According to an additional aspect of the invention, when selecting a free line, the connection situation of the traffic source, that is to say of the subscriber access unit at which the traffic (call) has originated or is arriving, is taken into account as a new criterion. The use of a possibly-available free line from the traffic source to the desired switching center keeps the internal load in the switching center, which is relaying the traffic, as low as possible. Implementation of the invention requires mainly adaptations to the program for line selection and, as a rule, only minor hardware changes, or none at all, so that the invention can also be implemented cost-effectively.

The invention is particularly simple and efficient if the first free connecting line which originates from the subscriber access unit is used for a call. According to a further aspect of the invention, in order to ensure that the line utilization level is uniform, it is also possible to provide for that connecting line which has not been used for the longest time and which originates from the subscriber access unit producing the traffic to be used.

The invention can be integrated in a particularly simple manner in existing systems if, in order to determine a free connecting line, all the free connecting lines in the group of lines are investigated to determine whether they originate from the subscriber access unit, which is receiving the call, or from the subscriber access unit at which the call originated. In this way, a normal search strategy, namely a search for free lines, is used, to which a check is then just added to determine whether there are any free lines originating from the traffic source.

In order to ensure that a connection is made even in the situation where none of the lines originating from the traffic source is free or there are no lines leading from the traffic source to the desired switching center, the invention provides that when no free connecting line originating from the subscriber access unit is present, another free connecting line of another subscriber access unit or of the line trunk group in the group of lines is selected for a call.

In this case, that connecting line which has not been used for the longest time is normally selected once again.

The search for a free connecting line is expediently carried out by the switching center, but it is also possible for the search to be carried out in a switching unit or distributed between a number of switching units.

Furthermore, according to another aspect of the invention, a switching center is set up such that when an incoming or outgoing call occurs at the subscriber access unit, a check is carried out to determine whether a connecting line which leads away from this subscriber access unit in the group of lines is free for a call to the desired switching center, and is furthermore set up such that if one of these connecting lines is free, it sets up a connection to the other switching center via this connecting line.

The advantages of the switching center according to the invention have already been described in conjunction with the method according to the invention.

DETAILED DESCRIPTION OF THE INVENTION

Figure 1:
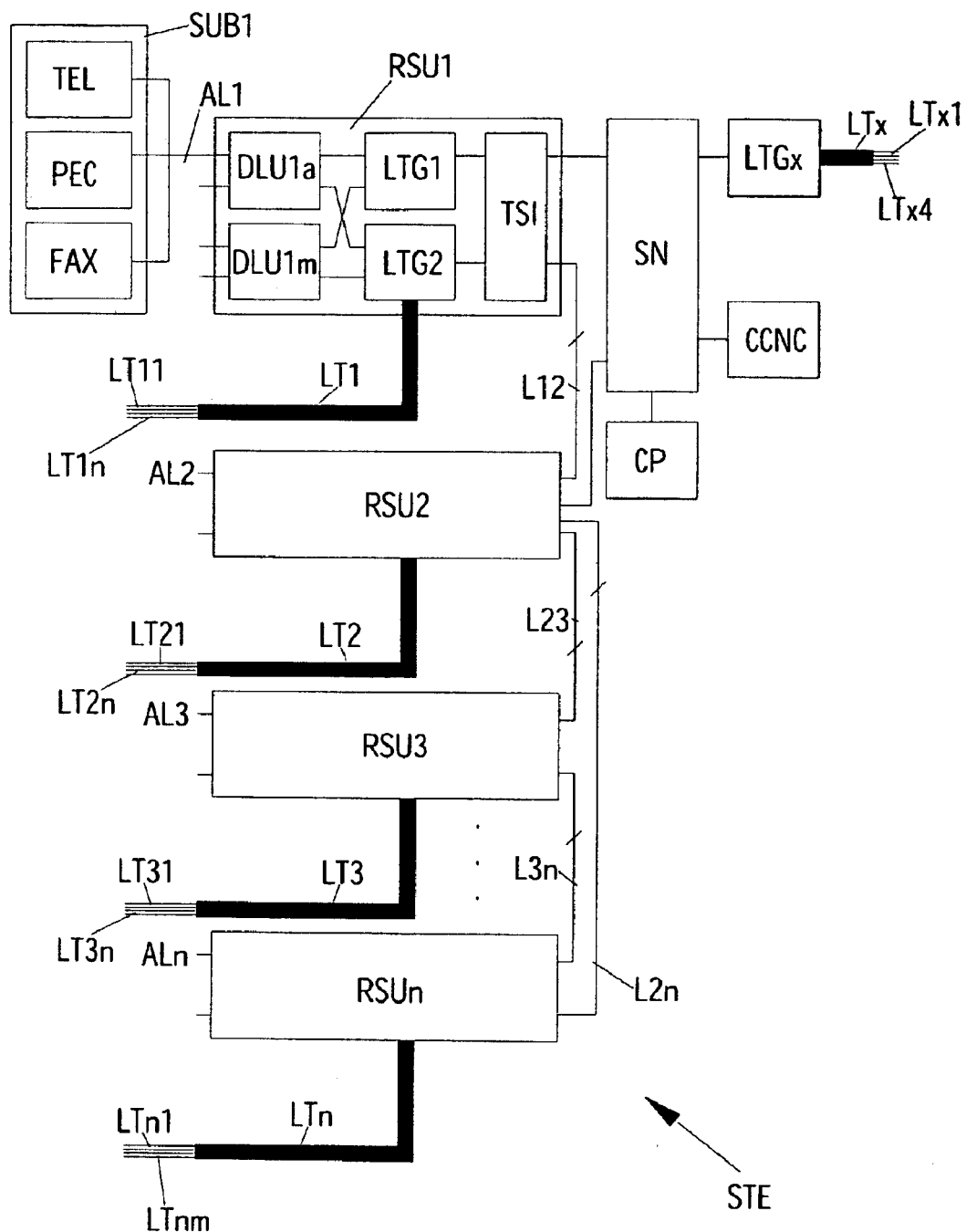
FIG. 1 shows a detailed view of a switching center according to the invention.

The switching center STE, as illustrated schematically in FIG. 1 of the drawing, of a switching network which has a number of switching centers has a range of subscriber access units RSU1, RSU2, RSU3 to RSUn, which may each be provided for so-called remote subscriber access and may also be referred to as remote switching units. The relevant subscriber access units RSU1, RSU2, RSU3, RSUn may each be constructed in the same way; FIG. 1 therefore shows the detailed construction of only the subscriber access unit RSU1.

The subscriber access unit (switching unit) RSU1 has a range of line termination units DLU1$a$ to DLU1$m$ which may be, by way of example, digital line termination units. The relevant line termination units DLU1$a$ to DLU1$m$ each have a number of access lines of which the drawing shows only the access line AL1. A subscriber point SUB1 is connected to this access line AL1 and, in this case, may be at least one digital subscriber terminal, such as an ISDN telephone, a personal computer or PC, a fax machine and/or other communication terminals. A telephone terminal TEL, a personal computer PEC and a fax machine FAX are indicated as being related to the subscriber point SUB1. It should be noted here that the individual subscriber points may also be analog terminals, which are connected to appropriately designed line termination units.

The line termination units DLU1$a$ to DLU1$m$ are normally each connected via line termination groups (of which the drawing shows only the two line termination groups LTG1, LTG2) to a time channel converter TSI for the relevant subscriber access unit RSU1. This time channel converter TSI is used for conversion of the individual subscriber points in the subscriber access unit RSU1 in the course of calls to respectively associated time channels for the situation where these calls are to be made to subscriber points within the relevant subscriber access unit RSU1 or to subscriber points from other subscriber access units which are connected directly or indirectly to the subscriber access unit RSU1 by a connection arrangement.

The subscriber access unit RSU1 is furthermore connected to a central switching network SN in the switching center STE under consideration in the switching network by the above-mentioned time channel converter TSI, which is indicated only schematically and has its own control device, as well as interface circuits at its inputs/outputs. This switching network SN may be connected via at least one further line termination group LTGx and a group of lines LTx, which is connected to it and has a large number of lines LTx1, . . . , LTxn, to a further switching center in the switching network. A coordination processor CP and a central signaling detection device CCNC are also connected to the above-mentioned switching network SN as the central switching unit in the illustrated switching center, which central signaling detection device CCNC carries out tasks which go beyond pure dialing information detection, with regard to signaling via a central signaling channel in accordance with the No. 7 signaling system. The signaling in accordance with the No. 7 signaling system is normally used only in the course of calls which are being set up or have been set up between different switching centers in the switching network. The coordination processor CP and the above-mentioned signaling detection device CCNC thus represent a central control device CPS for the switching center STE.

In the drawing, with regard to the other subscriber access units RSU2, RSU3 and RSUn which are each indicated only schematically, access lines AL2, AL3 and Aln, respectively, are indicated as being representative of a large number of access lines that are provided there, to which subscriber points corresponding to the subscriber point SUB1 can be connected. According to the drawing, of the relevant further subscriber access units, only the subscriber access unit RSU2 is connected to the switching network SN although, in principle, more subscriber access units, or all the subscriber access units, can be connected to the switching network. In addition, the subscriber access unit RSU2 is connected via a connecting line or a group of connecting lines L12 to the subscriber access unit RSU1 which is adjacent to it, and via a connecting line or a group of connecting lines L23 to the subscriber access unit RSU3 which is adjacent to it. In principle, all the subscriber access units which are provided are connected to one another in this way by a connection arrangement of any desired configuration. However, this will not be described in any further detail at this point since the connection arrangement is not relevant to the present invention.

The subscriber access unit RSUn is furthermore connected via internal connecting lines or groups of connecting lines L2$n$ and L3$n$ to the subscriber access units RSU2 and RSU3.

The above-mentioned groups of connecting lines, which are each represented in the drawing by a connecting line crossed by a short oblique line, each have at least one connecting line.

The explained configuration of the switching center illustrated in the drawing, which is part of a switching network with a large number of such switching centers, allows communication connections to be set up from/to the various access lines, such as the access lines AL1, AL2, AL3 to ALn under the control of the coordination processor CP via the central switching device, that is to say the central switching network SN. The dialing information which is required for this purpose is normally provided via separate signaling channels from the individual subscriber points to the central signaling detection device CCNC. The relevant connections are in this case connections to subscriber points of other switching centers.

Furthermore, it is also possible to set up communication connections between the access lines of subscriber access units, which are associated with subscriber access units (which are not adjacent to one another) of the switching center under consideration, for example between the subscriber access units RSU1 and RSUn, without including the central switching unit or the central switching network SN for this switching center, in such a switching center, although this will not be described in any more detail here.

Figure 2:
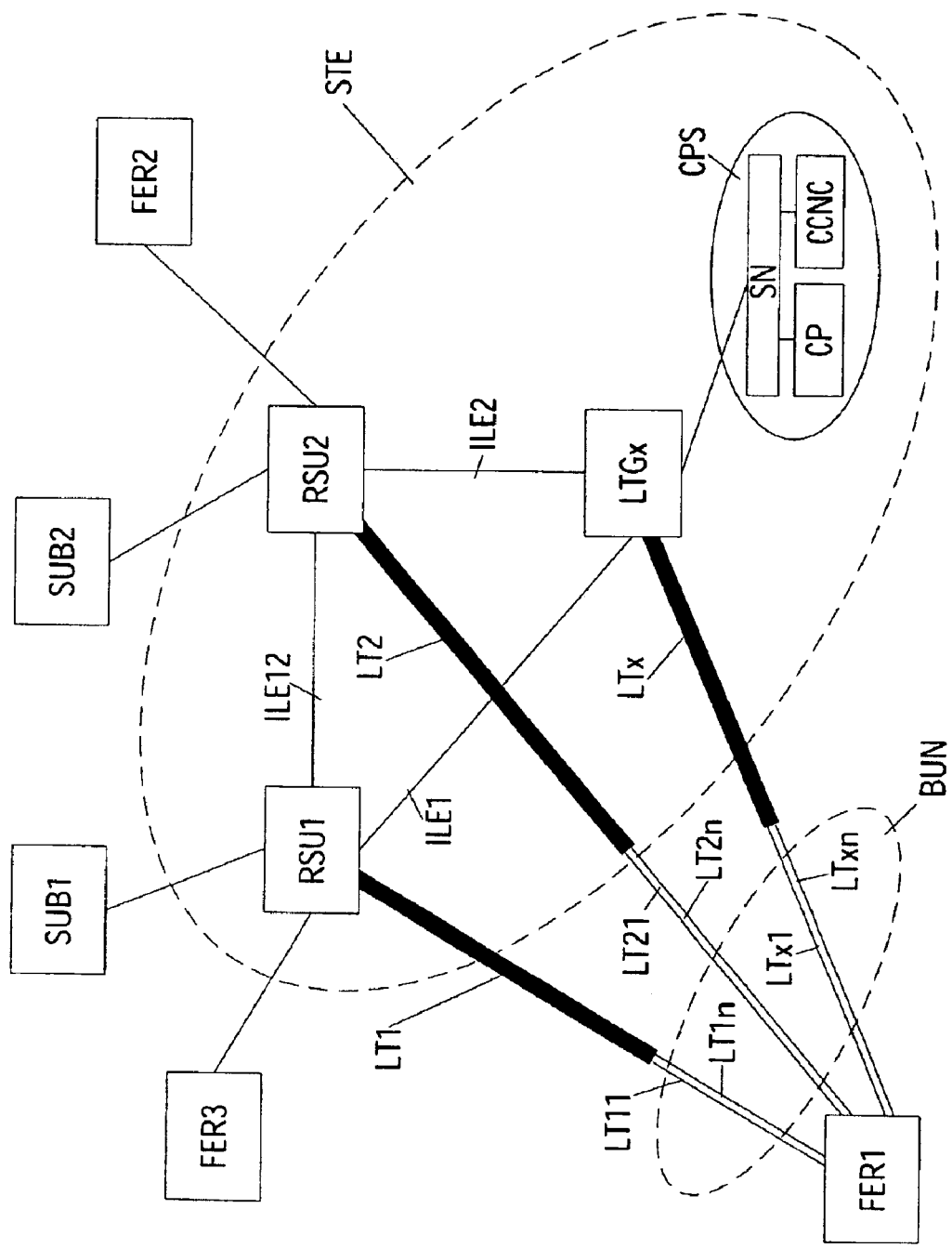
FIG. 2 shows a schematic illustration of a switching center according to the invention, as part of a switching network.

Furthermore, the line termination groups of the subscriber access units, such as the line termination group LTG2 of the subscriber access unit RSU1, are additionally connected to groups of transmission lines (so-called trunk groups), which lead to other switching centers in the switching network, as is illustrated schematically in FIG. 2. Groups of transmission lines such as these are indicated in FIG. 1 by LT1, LT2, LT3 and LTn, respectively, with respect to the subscriber access units RSU1, RSU2, RSU3 and RSUn. In this case, each group of transmission lines has an entire range of transmission lines LT11, ..., LT1n, LT21, ..., LT2n, LT3l, ..., LT3n, LTnl, ..., LTnm.

Reference is now made to the schematic illustration in FIG. 2, in order to explain the present invention in more detail. FIG. 2 shows the switching center STE from FIG. 1, but only on the basis of the switching units RSU1 and RSU2, which are connected via internal lines ILE12, ILE1, ILE2 to one another and to the line termination group LTGx of the central control unit CPS, comprising at least the coordination processor CP, the switching network SN and the central signaling detection device CCNC. The connecting lines L12, L23, L3n, L2n, etc. shown in FIG. 1 as well as the connecting lines for the switching units RSU1, RSU2 to the switching network SN and to the line termination group LTGx of the central control unit CPS are in this case symbolized, in order to simplify the illustration, by the internal lines ILE12, ILE1, ILE2 mentioned above.

The switching center STE is now connected to another switching center FER1 via a logic group of lines BUN, which is formed from lines LT11, ..., LT1n, LT21, ..., LT2n, LTxl, ..., LTxn in the group of lines LT1, LT2, LTx. If traffic is now produced, for example, at the switching unit RSU1, for example as a result of a call from the subscriber unit SUB1 which is connected to this switching unit or as a result of a call arising from another switching center FER3, and this traffic is intended, for example, for another switching center FER1 in the switching network outside the switching center STE, then, with conventional switching centers, the call is made via one line in the group BUN, with this line being selected using a specific method. In this case, the method normally determines which line in the group is free for a connection and, for example, any one of these lines is then used. Furthermore, in order to make the utilization level uniform, it is possible to provide for the call to use that free line which has not been used for the longest time.

In principle, in this case, the switching center FER3 is once again connected via a logic group of lines to the switching center STE, which may contain lines from a number of subscriber access units or from all the subscriber access units, or else, for example, only lines from the subscriber access unit RSU1.

This procedure has the disadvantage, of course, that it results in a high internal traffic load in the switching center STE. If, for example, traffic is produced at the subscriber access unit RSU1 and the line in the group BUN which has not been used for the longest time is, for example, the line LT21 which leads from the subscriber access unit RSU2 to the switching center FER3, then the traffic must first of all be passed via internal lines ILE12 to the switching unit RSU2, from where the call is then made to the switching center FER3.

To avoid this internal load, or to keep it as small as possible, the invention uses a different procedure for the selection of the lines in that, when incoming or outgoing traffic occurs at a switching unit, at the switching unit RSU1 in the example, a check is carried out to determine whether one of the lines LT11, ..., LT1n in the group of lines LT1 which leads away from the unit RSU1 is free as part of the overall group BUN for passing on the traffic. If one of these lines LT11, ..., LT1n is determined to be free, then one of these lines is used to pass on the traffic.

If there is more than one free line in the group of lines LT1, it is then possible, for example, to use the first free line found, or the process determines which of these free lines has not been used for the longest time. Other selection methods are, of course, then also feasible.

Normally, a program for line selection is in this case used to check which lines in the group BUN are free, and then which of these free lines originates from the group of lines LT1 for the subscriber access unit RSU1.

If none of the lines LT11, ..., LT1n in the group of lines LT1 are free, then a free line LT21, ..., LT2n, LTxl, LTxn is determined in the normal way from a group of lines LT2, LTx of another subscriber access unit RSU2 or of the line trunk group LTGx, and the traffic is diverted internally to this access unit RSU2 or line termination group LTGx, and is then passed to the desired switching center FER3, in which case a conventional method can once again be used to select the free line.

The procedure according to the invention allows the internal load in the respective switching center STE to be kept low. The group of transmission lines LT1–LTn means that communication connections from and to other switching centers need not be passed via the switching network SN (which forms the central switching unit) of the illustrated switching center, but can be set up directly from the individual subscriber access units, that is to say without including the central switching unit and without any bypass via other internal lines in the relevant switching center.

The selection of the free line is simply moved to the program for line selection which, for example, runs in the coordination processor CP. In consequence, no additional hardware devices are required, and no manipulations are required on the traffic data either. If, for example, the subscriber access units in the switching center STE do not all have their own group of lines to the desired switching center FER3, then another line is sought in the normal way by the program for passing on traffic, and the traffic is passed on in a corresponding manner.

Referring to FIG. 2, the switching unit RSU2 is connected to a switching center FER2 and to a subscriber point SUB2 and that, of course, where incoming or outgoing traffic occurs at the switching unit RSU2, the invention can be used in an appropriate manner and, of course, also by way of example between FER2 and FER3.

What is claimed is:

1. A method for determining a free connecting line in a switching center which has a number of subscriber access units which are controlled by a switching center, comprising:

connecting the subscriber access units and at least one line trunk group in the switching center to one another via a switching network and/or internal lines, via which they can pass on calls between their connections;

connecting at least one of the subscriber access units via a group of transmission lines, which includes a number of transmission lines, to in each case one other switching center;

forming at least one logical group of lines with at least one of the group of transmission lines of a subscriber access unit and a group of lines which has a number of lines of the line trunk group, the at least one logical group of lines connecting the switching center to the other switching center;

passing on a call via one of the lines in the group to the other switching center when an incoming or outgoing call, which is intended for another switching center, occurs in a switching unit;

checking, when an incoming or outgoing call occurs at the subscriber access unit, to determine whether a connecting line which leads away from this subscriber access unit in the group of lines is free for a call to the desired switching center; and setting up a connection to the other switching center via this connecting line if one of these connecting lines is free.

2. The method as claimed in claim 1, wherein the first free connecting line which originates from the subscriber access unit is used.

3. The method as claimed in claim 1, wherein that connecting line which has not been used for the longest time and which originates from the subscriber access unit is used.

4. The method as claimed in claim 1, wherein, to determine a free connecting line, all the free connecting lines in the group of lines are investigated to determine whether they originate from the subscriber access unit, which is receiving the call, or from the subscriber access unit at which the call originated.

5. The method as claimed in claim 1, wherein when no free connecting line originating from the subscriber access unit is present, another free connecting line in the group of lines is selected for a call.

6. The method as claimed in claim 5, wherein the connecting line which has not been used for the longest time is selected.

7. The method as claimed in claim 1, wherein the search for a free connecting line is carried out by the switching center.

8. A switching center comprising a number of subscriber access units which are controlled by a switching center, wherein the subscriber access units and at least one line trunk group in the switching center are connected to one another via a switching network and/or internal lines, via which they can pass on calls between their connections, at least one of the subscriber access units is connected via a group of transmission lines, which comprises a number of transmission lines, to in each case one other switching center, at least one of the at least one group of transmission lines of a subscriber access unit and a group of lines which has a number of lines of the line trunk group form at least one logical group of lines, which connects the switching center to the other switching center, when an incoming or outgoing call which is intended for another switching center occurs in a switching unit, this call is passed on via one of the lines in the group of lines to the other switching center, and the switching center is set up such that when an incoming or outgoing call occurs at the subscriber access unit, a check is carried out to determine whether a connecting line which leads away from this subscriber access unit in the group of lines is free for a call to the desired switching center, and is furthermore set up such that if one of these connecting lines is free, the switching center sets up a connection to the other switching center via this connecting line.

9. The switching center as claimed in claim 8, wherein said switching center is set up to use the first free connecting line which originates from the subscriber access unit.

10. The switching center as claimed in claim 8, wherein said switching center is set up to use that connecting line which has not been used for the longest time and which originates from the subscriber access unit.

11. The switching center as claimed in claim 8, wherein said switching center is set up, in order to determine a free connecting line, to investigate all the free connecting lines in the group of lines to determine whether they originate from the subscriber access unit, which is receiving the call, or from the subscriber access unit at which the call originated.

12. The switching center as claimed in claim 8, wherein said switching center is set up such that when no free connecting line originating from the switching unit is present, another free connecting line in the group of lines is selected for a call.

13. The switching center as claimed in claim 12, wherein said switching center is set up to select that connecting line which has not been used for the longest time.

14. The switching center as claimed in claim 8, wherein the switching center is set up to search for a free connecting line.

* * * * *